United States Patent
Shashua

[11] Patent Number: 6,094,198
[45] Date of Patent: Jul. 25, 2000

[54] SYSTEM AND METHOD FOR RECONSTRUCTING SURFACE ELEMENTS OF SOLID OBJECTS IN A THREE-DIMENSIONAL SCENE FROM A PLURALITY OF TWO DIMENSIONAL IMAGES OF THE SCENE

[75] Inventor: Amnon Shashua, Cambridge, Mass.

[73] Assignee: CogniTens, Ltd., Ramat Hashoron, Israel

[21] Appl. No.: 08/787,345

[22] Filed: Jan. 27, 1997

Related U.S. Application Data

[63] Continuation of application No. 08/179,726, Jan. 10, 1994, Pat. No. 5,598,515.

[51] Int. Cl.$^7$ .................................................. G06T 11/40
[52] U.S. Cl. .......................................... 345/419; 345/422
[58] Field of Search .................................... 345/419, 422, 345/420, 423, 424; 348/40, 42, 51

[56] References Cited

U.S. PATENT DOCUMENTS

| | | | |
|---|---|---|---|
| 5,592,597 | 1/1997 | Kiss ........................................ | 345/419 |
| 5,604,891 | 2/1997 | Burnett et al. ...................... | 345/419 X |
| 5,609,812 | 3/1997 | Childers et al. .................... | 345/419 X |
| 5,642,124 | 6/1997 | Kawai et al. ....................... | 345/419 X |
| 5,642,293 | 6/1997 | Manthey et al. .................... | 345/419 X |

*Primary Examiner*—Phu K. Nguyen
*Assistant Examiner*—Cliff N. Vo
*Attorney, Agent, or Firm*—Richard A. Jordan

[57] ABSTRACT

An arrangement for generating reconstructon information to facilitate reconstruction of three-dimensional features of objects in a scene based on two-dimensional images of the scene taken from a plurality of locations. The arrangement includes a plurality of elements including an epipole generating means, a homography generating means and a depth value generating means. The epipole generating means identifies the location of epipoles, that is, the coordinates in each image plane, in which the images were recorded, of the point of intersection of the line interconnecting the centers of projection of the image recorders that record the images. The homography generating means uses the epipoles and the coordinates in the respective images of selected reference points to generate a homography that relates the coordinates of all points in the images. Finally the depth value generating means uses the homography generated by the homography generating means and the coordinates of the projection of at least one other point, other than the selected reference points, in the images to generate, for generating a depth value representative of the distance of the other point relative to the location of at least one of the image recorders. Using the depth values generated for an number of points of objects in the scene and the coordinates of the projections of the points in at least one of the image planes, as determined from the images, the three-dimensional (Euclidean) structures of the objects can be determined.

1 Claim, 3 Drawing Sheets

100. GENERATE, IN RESPONSE TO IMAGE PLANES $\Psi 1$ AND $\Psi 2$, THE LOCATIONS OF THE EPIPOLES v AND v' IN THEIR RESPECTIVE IMAGE PLANES $\Psi 1$ AND $\Psi 2$.

101. FOR THREE POINTS PJ, J=1,2,3, DEFINING A FIRST REFERENCE PLANE $\pi 1$, DETERMINE FROM THE PROJECTIONS $PJ_{\Psi 1}$ AND $PJ_{\Psi 2}$ OF THE POINTS PJ IN THE TWO IMAGE PLANES $\Psi 1$ AND $\Psi 2$ A HOMOGRAPHY "$A_1$" THAT SATISFIES THE RELATION $A_1 PJ_{\Psi 1} \cong PJ_{\Psi 2}$, J=1,2,3, AND $A_1 v \cong v'$.

102. FOR THREE POINTS PJ, J=2,3,4 DEFINING A SECOND REFERENCE PLANE $\pi 2$, DETERMINE FROM THE PROJECTIONS $PJ_{\Psi 1}$ AND $PJ_{\Psi 2}$ OF THE POINTS PJ IN THE TWO IMAGE PLANES $\Psi 1$ AND $\Psi 2$ A HOMOGRAPHY "$A_2$" THAT SATISFIES THE RELATION $A_2 PJ_{\Psi 1} \cong PJ_{\Psi 2}$, J=2,3,4, AND $A_2 v \cong v'$.

103. FOR A REFERENCE POINT $P_0$ OF AN OBJECT IN THE SCENE HAVING CORRESPONDING PROJECTIONS $P_{0\Psi 1}$ AND $P_{0\Psi 2}$ IN THE TWO IMAGES RECORDED ON RESPECTIVE IMAGE PLANES $\Psi 1$ AND $\Psi 2$, SCALE ONE OR BOTH OF THE HOMOGRAPHIES $A_1$ AND $A_2$ TO SATISFY THE RELATION $P_{0\Psi 2} \cong A_1 P_{0\Psi 1} + A_2 P_{0\Psi 1}$

104. FOR A POINT P OF AN OBJECT IN THE SCENE HAVING CORRESPONDING PROJECTIONS $P_{\Psi 1}$ AND $P_{\Psi 2}$ IN THE TWO IMAGES RECORDED ON RESPECTIVE IMAGE PLANES $\Psi 1$ AND $\Psi 2$, RECOVER AN INVARIANT VALUE $\kappa$ THAT SATISFIES THE RELATION $P_{\Psi 2} \cong A_1 P_{\Psi 1} - \kappa A_2 P_{\Psi 1}$

*FIG. 3*

SYSTEM AND METHOD FOR RECONSTRUCTING SURFACE ELEMENTS OF SOLID OBJECTS IN A THREE-DIMENSIONAL SCENE FROM A PLURALITY OF TWO DIMENSIONAL IMAGES OF THE SCENE

This is a continuation of U.S. application Ser. No. 08/179,726 filed on Jan. 10, 1994 now U.S. Pat. No. 5,598,515.

INCORPORATION BY REFERENCE

A. Shashua, "Projective Structure From Uncalibrated Images: Structure From Motion And Recognition", a copy of which is attached hereto as an appendix, incorporated herein by reference.

FIELD OF THE INVENTION

The invention relates generally to the fields of photogrammetry and image processing, and more particularly to systems and methods for reconstructing and regenerating elements and features of three-dimensional objects in a scene from a plurality of two-dimensional images of the scene.

BACKGROUND OF THE INVENTION

Reconstruction of three-dimensional objects in a scene from multiple two-dimensional images of the scene has been the subject of research since the late 19th century. Such reconstruction may be useful in a number of areas, including obtaining information about physical (three-dimensional) characteristics of objects in the scene, such as determination of the actual three-dimensional shapes and volumes of the objects. Reconstruction has also recently become particularly important in, for example, computer vision and robotics. The geometric relation between three-dimensional objects and the images created by a simple image recorder such as a pin-hole camera (that is, a camera without a lens) is a source of information to facilitate a three-dimensional reconstruction. Current practical commercial systems for object reconstruction generally rely on reconstruction from aerial photographs or from satellite images. In both cases, cameras are used which record images from two locations, whose positions relative to a scene are precisely determinable. In reconstruction from aerial photographs, two cameras are mounted with precise spacing and orientation on a common airborne platform, which ensures that the geometries of the cameras relative to each other are fixed in a known condition. With satellites, the positions and orientations of the satellites can be determined with great accuracy, thereby providing the required geometrical information required for reconstruction with corresponding precision. In any case, reconstruction of the desired objects shown in the images can be performed from two-dimensional photographic or video images taken from such an arrangement.

Generally, reconstruction methods are non-linear and they generally do not behave well in the presence of errors in measurement of the various camera calibration parameters and in the images from which the objects are to be reconstructed. Conventional reconstruction methods rely on the successful decoupling of two sets of parameters known as intrinsic and extrinsic parameters. The extrinsic parameters are related to the external geometry or arrangement of the cameras, including the rotation and translation between the coordinate frame of one camera in relation to the coordinate frame of the second camera. The intrinsic parameters associated with each camera is related to the camera's internal geometry in a manner that describes a transformaton between a virtual camera coordinate system and the true relationship between the camera's image plane and its center of projection (COP). The intrinsic parameters can be represented by the image's aspect ratio, the skew and the location of the principal point, that is, the location of the intersection of the camera's optical axis and the image plane. (Note that the camera's focal length is related to the identified intrinsic parameters, in particular the aspect ratio, and thus it need not be considered as a parameter.)

These intrinsic and extrinsic parameters are coupled together and it is possible to recover the Euclidean three-dimensional structure of the scene depicted in two views only if these two sets of parameters can be decoupled. The precise manner in which the intrinsic and extrinsic parameters are coupled together is as follows. If the intrinsic parameters for the cameras are used to form respective three-by-three matrices M and M', and R and "t" represent the rotational and translational external parameters, then for points $p=(x,y,1)^T$ and $p'=(x',y',1)^T$ ("T" represents the matrix transpose operation) representing the projection in the two images of a single point in the scene, $$z'p' = zM'RM^{-1}p - M't \qquad \text{Eqn. (1)}$$

where z and z' represent respective depth values relative to the two camera locations.

In general, there are two conventional methods for reconstruction. In one method, the values of the internal parameters are determined by a separate and independent "internal camera calibration" procedure that relies on images of specialized patterns.

In the second reconstruction method, more than two views of a scene are taken and processed and the two sets of parameters are decoupled by assuming that the internal camera parameters are fixed for all views. Processing to determine the values of the parameters proceeds using non-linear methods, such as recursive estimation, non-linear optimization techniques such as Levenberg-Marquardt iterations, and more recently projective geometry tools using the concept of "the absolute conic."

One significant problem with the first approach (using a separate internal camera calibration step) is that even small errors in calibration lead to significant errors in reconstruction. The methods for recovering the extrinsic parameters following the internal calibration are known to be extremely sensitive to minor errors in image measurements and require a relatively large field of view in order to behave properly. In the second approach (using more than two views of a scene) the processing techniques are iterative based on an initial approximation, and are quite sensitive to that initial approximation. In addition, the assumption that the internal camera parameters are fixed is not always a good assumption.

SUMMARY OF THE INVENTION

The invention in one aspect provides an arrangement for generating the structure of objects in a scene using a new methodology that does not depend on internal calibration of the camera(s) that record images of the scene.

In bireft summary, the arrangement operates in connection with images of a scene recorded by image recorders located at a plurality of diverse locations. The arrangement includes a plurality of elements including an epipole generating means, a homography generating means and a depth value generating means. The epipole generating means identifies the location of epipoles, that is, the coordinates in each image plane, in which the images were recorded, of the point of intersection of the line interconnecting the centers of projection of the image recorders that record the images. The homography generating means uses the epipoles and the coordinates in the respective images of selected reference points to generate a homography that relates the coordinates of all points in the images. Finally the depth value generating means uses the homography generated by the homography generating means and the coordinates of the projection of at least one other point, other than the selected reference points, in the images to generate, for generating a depth value representative of the distance of the other point relative to the location of at least one of the image recorders. Using the depth values generated for an number of points of objects in the scene and the coordinates of the projections of the points in at least one of the image planes, as determined from the images, the three-dimensional (Euclidean) structures of the objects can be determined.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 3 is a flow diagram illustrating the operations performed by the arrangement depicted in FIG. 1.

DETAILED DESCRIPTION OF AN ILLUSTRATIVE EMBODIMENT

Figure 1:
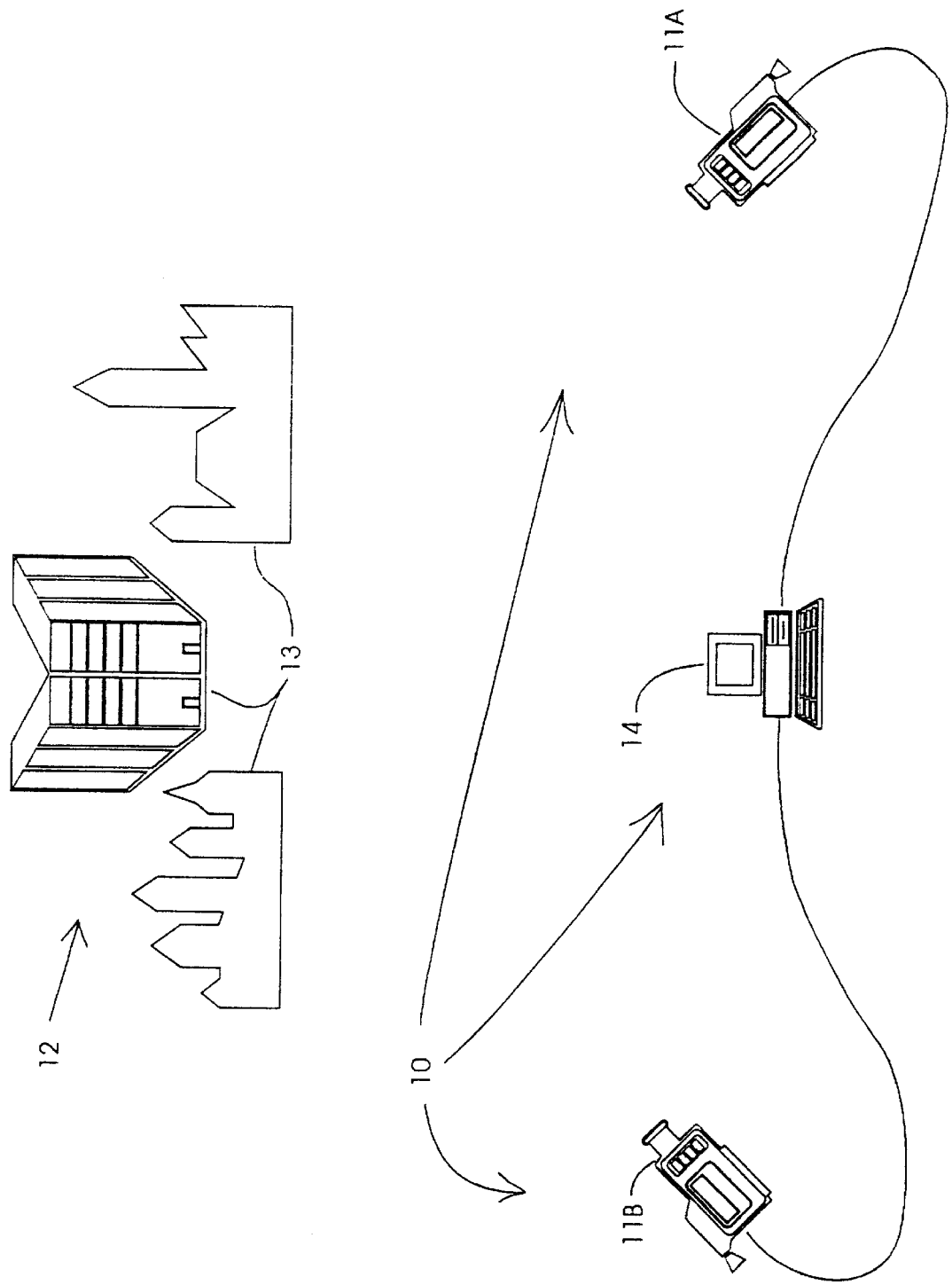
FIG. 1 is a diagram schematically illustrating an arrangement for reconstructing objects in a scene, in accordance with the invention.

FIG. 1 is a diagram schematically illustrating an arrangement 10 for reconstructing, in three dimensional form, surfaces of objects in a scene, based on two-dimensional images of the scene, in accordance with the invention. With reference to FIG. 1, arrangement 10 includes a plurality of image recorders 11A and 11B (generally identified by reference numeral 11) such as photographic or video cameras, which record two-dimensional images of a scene 12. The scene 12 generally comprises a plurality of three-dimensional objects, represented in FIG. 1 by buildings identified by reference numeral 13. At least some aspects of the objects in scene 12 are to be reconstructed, in three-dimensional form, from the images recorded by the image recorders 11. The image recorders 11 are positioned to record images of the scene 12 from two diverse angles; that is, for objects 13 whose three-dimensional surfaces are to be reconstructed in three-dimensional form, both image recorders 11 record the portions of the surfaces to be reconstructed. The arrangement 10 further includes an image analyzer module 14 which receives the images from the image recorders 11 and analyzes them to actually perform the reconstruction operations described below in connection with FIGS. 2 and 3. In accordance with those operations, the image analyzer moduel 14 reconstructs, in three-dimensional form, features of selected objects in the scene 12 which are visible in the two images.

Figure 2:
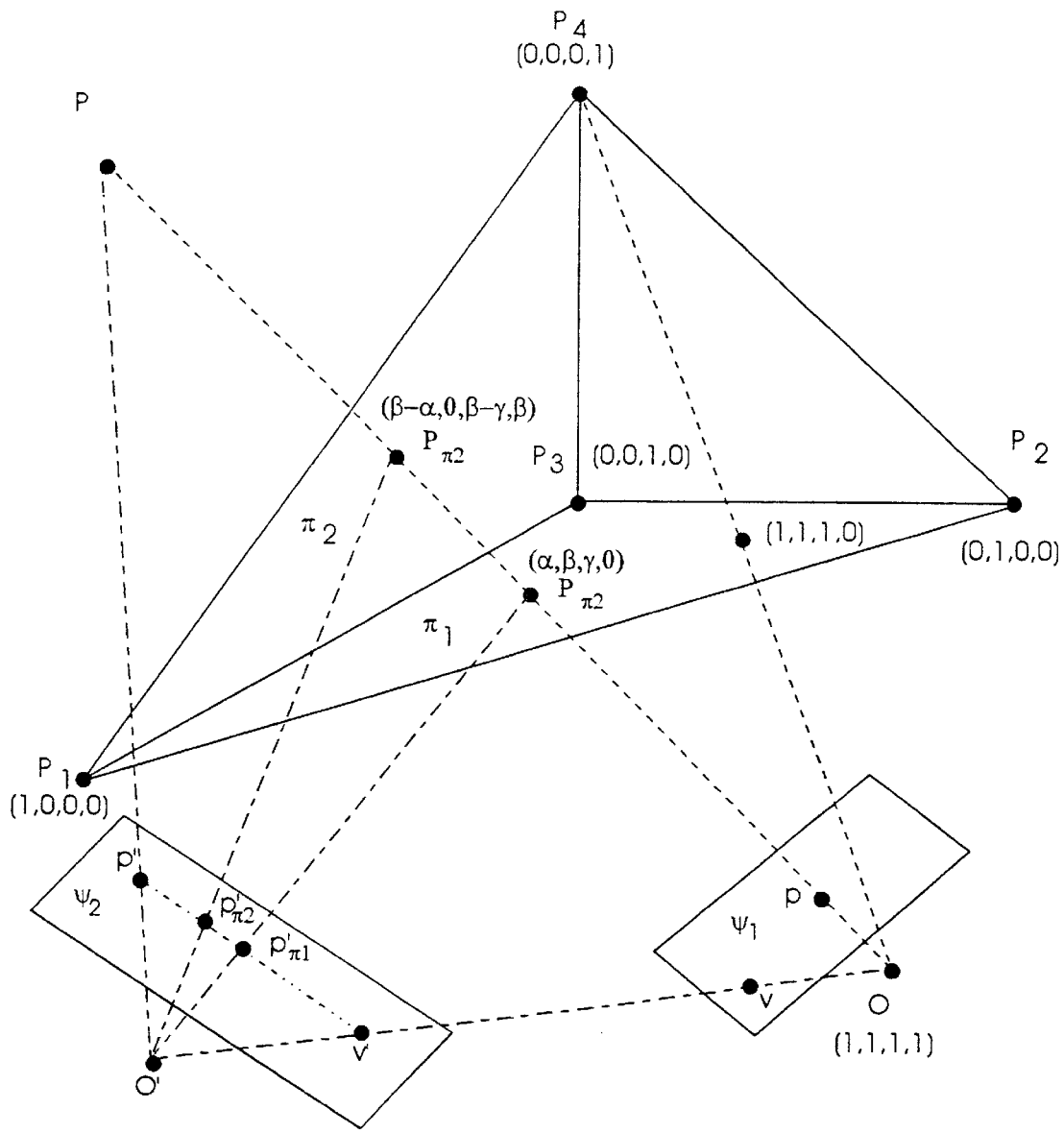
FIG. 2 is a diagram useful in understanding the operation of the arrangement depicted in FIG. 1.

The specific operations performed by the image analyzer module 14 in performing the reconstruction operation will be described, in two aspects, below in connection with FIGS. 2 and 3. Initially with respect to FIG. 2, that Fig. depicts a point P in a scene and two points O and O' representing centers of projection of respective image recorders recording the scene. In addition, FIG. 2 depicts a reference plane $\pi 1$ and a second reference plane $\pi 2$, which is also defined by three points. Since any two planes in images of the scene recorded by the image recorders, the reference plane $\pi 1$ is shown in FIG. 2 as being defined by three points $P_j$, $j=1,2,3$, and reference plane $\pi 2$ is defined by three points $P_j$, $j=2,3,4$, with all points $P_j$ being points of the scene as recorded by both image recorders. FIG. 2 also depicts two image planes assocaited with the respective image recorders, in particular an image plane $\psi 1$ associated with the image recorder at location O, and a second image plane $\psi 2$ associated with the image recorder at location O'. That is, image plane $\psi 1$ is the plane of the image as recorded by the image recorder whose center of projeciton is at location O and image plane $\psi 2$ is the plane of the image as recorded by the image recorder whose center of projection is at location O'. A line extending between the two centers of projections O and O' intersect the image planes by $\psi 1$ and $\psi 2$ at points v and v', which are termed epipoles. In this arrangement, the point P and reference planes $\pi 1$ and $\pi 2$ are said to be in a three-dimensional projective space $P^3$ which project onto image planes $\psi 1$ and $\psi 2$, with each image plane defining a two-dimensional projective space $P^2$. If $A_1$ and $A_2$ are projective mappings, or homographies, from image plane $\psi 1$ to image plane $\psi 2$ due to reference planes $\pi 1$ and $\pi 2$, respectively, and given a selected reference point $P_0$ not on either reference plane in the scene which project onto points $p_0$ and $p_0'$ in the two image planes $\psi 1$ and $\psi 2$, respectively, then homographies $A_1$ and $A_2$ can be scaled so that $$p'_0 \cong A_1 p_0 + A_2 p_0 \qquad \text{Eqn. (2)}$$

(In this case, each homography is in the form of a three-by-three matrix; for transformations in projective spaces of higher or lower numbers of dimensions, the homographies will be correspondingly higher or lower numbers of rows and columns.) Thus, the coordinates $(x_0',y_0',1)$ of a point $p_0'$ (the projection of reference point $P_0$ onto the image plane $\psi 2$) are related to the coordinates $(x_0,y_0,1)$ of point $p_0$ (the projection of the same reference point $P_0$ onto the image plane $\psi 1$) by the homographies $A_1$ and $A_2$ in accordance with equation Eqn. 2. Then, for any point P in the scene (that is in three-dimensional projective space $P^3$ projected onto image planes $\psi 1$ and $\psi 2$ at points p and p', respectively, the coordinates $(x',y',1)$ of point p' in image plane $\psi 2$ are related to the coordinates $(x,y,1)$ of point p in image plane $\psi 1$ by $$p' \cong A_1 p + \kappa A_2 p \qquad \text{Eqn. (3)}$$

where "$\kappa$" is a "projective invariant", that is, its value is independent of the positions of the two cameras and their internal parameters.

Equation Eqn. 3 means that, by determining the homographies $A_1$ and $A_2$ between the image planes $\psi 1$ and $\psi 2$ due to two reference planes $\pi 1$ and $\pi 2$, the projective invariant $\kappa$ can be determined for any point P in the scene as recorded by the two image recorders. The projective invariant $\kappa$ will be termed herein "projective depth." The geometric description of $\kappa$ for point P is related to location O as follows. As shown in FIG. 2, the line that intersects points P and O intersects the two reference planes $\pi 1$ and $\pi 2$ at respective points $P_{\pi 1}$ and $P_{\pi 2}$, with a cross-ratio $C_P = > P, O, P_{\pi 1}, P_{\pi 2} >$ defined as:

$$C_p = \frac{|P - P_{\pi 1}|}{|P - P_{\pi 2}|} * \frac{|O - P_{\pi 2}|}{|O - P_{\pi 1}|} \qquad \text{Eqn. (4)}$$

Similarly, a line that intersects points a reference point $P_0$ (not shown) and O intersects the two reference planes π1 and π2 at resepctive points $P_{\pi 1}'$ and $P_{\pi 2}'$ (also not shown), with a cross-ratio $C_{P_0} = <P_0, O, P'_{\pi 1}, P'_{\pi 2}>$ defined as:

$$C_{P_0} = \frac{|P_0 - P'_{\pi 1}|}{|P_0 - P'_{\pi 2}|} * \frac{|O' - P'_{\pi 2}|}{|O' - P'_{\pi 1}|} \qquad \text{Eqn. (5)}$$

The value of κ is the ratio of the two cross-ratios $C_P$ and $C_{P_0}$ $$\kappa = \frac{C_P}{C_{P_0}} \qquad \text{Eqn. (6)}$$

The value of κ for each point P in the scene will remain unchanged (that is, invariant) regardless of the location of point O, and therefore under any projective transformation of the scene, that is, under any rigid transformation of the scene followed by scaling, stretching,, shearing and mapping of regular points onto points at an infinite distance. Accordingly, in this manner, the conventional representation of shape, that is, the depth of each point P in a scene relative to the center of projection of the recording device(s), is replaced with the projective representation κ, which, as follows from equations Eqn 2 and Eqn. 3, is determined for each point P only from its projections p and p' in the image planes ψ1 and ψ2. These projections do not depend on the recording device being calibrated, since changing the intrinsic parameters of the recording device introduces a projective transformation of the images recorded thereby, with respect to which κ is invariant, as described above.

It necessarily follows from the above discussion of FIG. 2 that the image analyzer module 14 can determine the location of each point in the scene relative to the location of the center of projection O of one of the image recorders 11 by use of the coordinates in the image plane of the projection of the respective point and the value of κ, determined as set forth above.

In general, a homography of the plane is defined by four coplanar points. Since four randomly-chosen points in space are generally not coplanar, an alternative means must be used for determining a homography. Consequently, it can be shown that the projections of three points (three points in a scene always defining a plane) and the epipoles are sufficient to uniquely determine a homography associated with the plane defined by the three points. In general, a projective transformation (that is, a homography) A between two image planes due to the reference plane $\pi_i$ can determined from the coordinates of the projection points in the two images of the three points defining the reference plane and the coordinates of the two epipoles in the image planes. That is, for three points Pj, j=1,2,3, having projections $p_j$ and $p_j'$ in the two images, and epipoles v and v':

$$A\,p_j \cong p', \; j=1,2,3 \qquad \text{Eqn. (7)}$$

$$A\,\sigma \cong \sigma' \qquad \text{Eqn. (8)}$$

Therefore, with corresponding projections of three points in two images and the epipoles, a homogrpahy A due to a reference plane $\pi_i$ can be determined using equations Eqn. 7 and Eqn. 8. Since this can be performed for any plane selected as a reference plane, this can clearly be done for two distinct reference planes π1 and π2, thereby providing the required homographies $A_1$ and $A_2$ for equations Eqn. 2 and Eqn. 3 above.

The coordinates of the epipoles can be determined as follows. If, as above, A is a homography due to a reference plane $\pi_i$, then $$(p')^T [\sigma'] A p = 0 \qquad \text{Eqn. (9)}$$

where "T" indicates the matrix transpose operation and [v'] indicates the skew-symmetric matrix of v' (that is, [v']χ= v'xχ for any vector χ, "x" representing the cross-product operation). If [v']A is represented by "F", then from equation Eqn. 9, $$(p')^T F p = 0 \qquad \text{Eqn. (10)}$$

From this, the coordinates of the epipoles can be determined in at least two ways. In one way, the values of the entries of matrix F can be determined from projections of eight corresponding pionts in a scene onto two images. Equation Eqn. 10 provides an equation which is linear with the values of the entries of matrix F. Since, as noted above, Av≅v', and since v'xv'=0 (the cross-product of any vector with itself is zero), then v'xAv=v'xv'=0. Further, since F=[v']A=v'xA, then v'xAv=Fv=0. Similarly, the coordinates of v' can be determined since $F^T v'=0$. It should be noted that, in this method, the homography A does not have to be determined, since the values of matrix F can be determined directly from equation Eqn. 10, and matrix F can be used to determine the coordinates of the epipoles directly.

In a second method for determining the coordiantes of the epipoles, homography A is determined with reference to four co-planar points Pj, j=1,2,3,4, in a scene, in particular the coordinates of the projections pj and pj' in the respective image planes ψ1 and ψ2. In that case, homography A is determined by $Ap_j \cong p'_j$, j=1,2,3,4. Homography A is then used in equation Eqn. 10 to determine the coordinates of epipole v'. Since the coordinates of epipole v' in image plane ψ2 are defined as $(x_v, y_v, 1)$, with $x_v$ and $y_v$ being unknown values to be determined, equation Eqn. 10 can provide values for the coordinates with projections of as few as two points in a scene. However, if projections of more points in the scene are used, the coordinates of epipole v' can be determined using a least-squares methodology, which can be useful in reducing measurement errors that might develop by using projections of only two points. After the values of coordinates of epipole v' have been determined, the values of the coordinates of epipole v can be determined from Av≅v' noted above.

With this background, the operations performed by the image analyzer module module 14 in accordance with one aspect of the invention will be described in connection with FIG. 3. With reference to FIG. 3, the image analyzer module 14 initially generates the coordinates of the epipoles v and v' in their respective image planes ψ1 and ψ2 as described above (step 100). The image analyzer module 14 uses the coordinates of the epipoles and the coordinates of the projections of three corresponding points Pj, j=1,2,3 onto the two image planes ψ1 and ψ2 (the projections being designated pj and pj', j=1,2,3, respectively) to generate entries of the matrix comprising the homography $A_1$ by satisfying $A_1 p_j \cong p_j'$ and $A_1 v \cong v'$ (step 101), and repeats the operation with projections of another set of points Pj to generate entries of the matrix comprising homography $A_2$ (step 102). The image analyzer module 14 may use, as the set of points for generating homography $A_2$, a set that overlaps the set used for generating homography $A_1$, that is, if it uses projections of points Pj, j=1,2,3, in generating homography $A_1$, it can use projections of points Pj,j=2,3,4, in generating homography $A_2$.

The image analyzer module 14 generate homographies $A_1$ and $A_2$ as follows. If the coordinates of the projections of points Pj onto image plane $\psi 1$ are represented by $(x_j, y_j, 1)$, the coordinates of the projections of points Pj onto image plane $\psi 2$ are represented by $(x_j', y_j', 1)$, and the coordinates of the epipoles onto the image planes $\psi 1$ and $\psi 2$ are represented by $(x_v, y_v, 1)$ and $(x_v', y_v', 1)$, and if the value of entry $a_{3,3}$ of homography A is set to "1", the values of the remaining entries of homography A satisfy $$xa + ya_{12} - \frac{xx'}{z'}a_{31} - \frac{yx'}{z'}a32 = \frac{zx'}{z'} \qquad \text{Eqn. (11)}$$

$$xa_{21} + ya_{22} + za_{23} - \frac{xy'}{z'}a_{31} - \frac{yy'}{z'}a_{32} = \frac{zy'}{z'} \qquad \text{Eqn. (12)}$$

for each set of coordinates provided by the projections of points pj, pj' and v, v'. Accordingly, equations Eqn. 11 and Eqn. 12 provide eight equations, which suffice to generate the eight values for entries $a_{i,j}$ (all entries other that $a_{3,3}$, which, as noted above, is set to "1") of the matrix comprising a homography A.

After the image analyzer module 14 generate the homographies $A_1$ and $A_2$, it selects projections $p_0$, $p_0'$ in the image planes $\psi 1$, $\psi 2$, of a reference point $P_0$, and scales one or both of the homographies to satisfy $$p'_0 \cong A_1 p_0 + A_2 p_0 \qquad \text{Eqn. (13)}$$

(step 103). Then, for every point P in a scene whose coordinates are to be recovered, the image analyzer module 14 uses projections p, p' in the image planes $\psi 1$ and $\psi 2$ to recover the projective depth value $\kappa$ from $$p' \cong A_1 p + \kappa A_2 p \qquad \text{Eqn. (14)}$$

(step 104). The projective depth value $\kappa$, along with the coordinates $(x_p, y_p, 1)$ of the projection of the points P of objects in the image plane $\psi 1$, suffice to define the coordinate of the points P for objects in the scene, and facilitate reconstruction of the objects.

The operations performed by the image analyzer module 14 can be simplified if two groups of four coplanar points in the scene can be identified. In that case, the image analyzer module 14 can determine the homographies $A_1$ and $A_2$ directly without first determining the coordinates of the epipoles v an v' in the image planes $\psi 1$ and $\psi 2$. If one group of four coplanar points can be identified, the image analyzer module can generate one homography, such as homography $A_1$, directly, and use it to determine the coordinates of the epipoles v and v' as described above. In that case, the image analyzer module 14 uses a fifth point, in addition to the four coplanar points, to generate both homographies, and an additional point to facilitate determining the coordinates of the epipole and setting the scale.

As described above, the image analyzer module 14 can reconstruct objects in a scene by use of two images of the scene recorded at two diverse locations O and O' to generate the value for the projective depth invariant $\kappa$ for each point P on an object to be reconstructed. However, errors may develop as a function of the limitations of measurement precision for each image. Such errors may be reduced by recording a plurality "m" of images and performing operations pairwise in connection with the recorded images in a least-squares manner. That is, for each pair of images, a $\kappa$ is generated as described above. Using the fact that, given vectors a, b, and c of the same number of dimensions, and if k is a scalar such that $a \cong b + kc$, the value of k can be determined in a least-squares fashion from $$k = \frac{(b \times a)^T (a \times c)}{\|a \times c\|^2} \qquad \text{Eqn. (15)}$$

Similarly, if for another set of vectors a', b', and c', $a' \cong b' + kc'$, then the value of k can be determined in a least squares fashion from both sets of vectors a, b, c, a', b', and c', from $$k = \frac{(b \times a)^T (a \times c) + (b' \times a')^T (a' \times c')}{\|a \times c\|^2 + \|a' \times c'\|^2} \qquad \text{Eqn. (16)}$$

Generalizing from equation Eqn. 16, if $A_{1ij}$ and $A_{2ij}$ are homographies from two reference planes $\pi 1$ and $\pi 2$ from image plane $\psi i$ to image plane $\psi j$, for each of the "m" images, and if "$p_i$" represents the coordinates of a point P as projected onto the "i-th" image plane $\psi i$, then the least-squares solution for $\kappa$ is given by $$\kappa = \frac{\sum_{i \neq j}(p_j \times A_{2ij} p_i)^T (A_{1ij} p_i \times p_j)}{\sum_{i \neq j}\|p_j \times A_{2ij} p_i\|^2} \qquad \text{Eqn. (17)}$$

As a simplification requiring the use of only one reference plane, such as reference plane $\pi 1$, instead of two reference planes, the image analyzer module 14, generates an affine depth invariant value k and uses it to generate a relative affine structure of objects in a scene recorded by the image recorders 11 (FIG. 1). Relative affine structure is described as follows. If (a) image recorders 11 at locations O and O' record images on image planes $\psi 1$ and $\psi 2$, respectively, (b) Pj, j=0,1,2,3, are four non-coplanar points in three-dimensional projective space $P^3$, which project onto the respective image planes $\psi 1$ and $\psi 2$ (two-dimensional projective space $P^2$) at points pj and p'j, j=0,1,2,3, respectively, and (c) points v and v' are the epipoles of image planes $\psi 1$ and $\psi 2$, respectively, (d) A is a homography, or collineation, of two-dimensional projective space $P^2$, due to a single reference plane $\pi$ defined by equations $Ap_j \cong p'_j$, j=1,2,3, and $Av \cong v'$, and (e) if the coordinates of epipole v' are scaled such that $p'_0 \cong Ap_0 + 1v'$, then for any point P in the scene projecting onto points p and p' on the respective image planes $\psi 1$ and $\psi 2$, $$p' \cong Ap + kv' \qquad \text{Eqn. (18)}$$

where "k" is an affine depth invariant whose value does not depend on the location O' of one of the image recorders and orientation of its associated image plane $\psi 2$. Accordingly, each point P in the scene that projects onto points p and p' on the respective image planes $\psi 1$ and $\psi 2$ is represented by coordinate (x, y, 1, k) where (x, y, 1) are the coordinates of the projection of the point onto the image plane $\psi 1$, and "k" represents the affine depth invariant value for the point P as determined in accordance with equation Eqn. 18. The affine depth invariant value k for a point P is the ratio of (a) the distance, along the line between location O and point P, from the reference plane $\pi$ to point P to (b) the distance from location O to point P, normalized by the same ratio for a reference point $P_0$, that is:

$$k = \frac{\frac{(P-P')}{(P-O)}}{\frac{(P_0-P'_0)}{(P_0-O)}} \qquad \text{Eqn. (19)}$$

In this case, unlike the projective depth invariant κ, which is invariant across images recorded for all pairs of image planes $\psi i$, $\psi j$, $i \neq j$, image relative affine depth k is fixed for the image plane $\psi 1$, and the value of k will be the invariant for the location O' defining of any other image plane $\psi j$, $j \neq 1$, which records the second image. In this aspect, the image analyzer module 14 may perform operations similar to those described above in connection with FIG. 3, except those requiring use of the second reference plane π2.

Similar to using a least-squares methodology to determine a value for the projective depth invariant κ from multiple images, the image analyzer module 14 may use a least squares methodology to determine a value for the relative affine depth value k over multiple images, recorded on image planes $\psi j$, j=2, . . . , m, defined by centers of projection O'$_j$, j=2, . . . , m, with one image, recorded on image plane $\psi 1$ defined by center of projection $O_1$, being a reference image. In that case, if $A_j$ represents the homography, due to reference plane π1, from the image recorded on image plane $\psi 1$, to the image recorded on image plane $\psi j$, j=2, . . . , m, and if the epipole on image plane $\psi 1$ due to image plane $\psi j$, j=2, . . . , m, is represented by $v_j$, and further if the projection of an object point P onto the image plane $\psi j$ is represented by $p_j$, then the image analyzer module 14 determines the value of affine depth invariant k in a least-squares methodology by $$k = \frac{\sum_{j=2}^{m}(p_j \times v_j)^T(A_j p_1 \times p_j)}{\sum_{j=2}^{m}\|p_j \times v_j\|^2} \qquad \text{Eqn. (20)}$$

The relative affine depth k is similar to the conventional depth (that is, distance from the center of projection/image plane) in the sense that its value depends on the location of the image recorder used for the reference image. However, unlike conventional depth, the value of the relative affince depth k is invariant to the internal parameters of the image recorder used to record the images. As described above, the values comprising the homography A are functions of the external and internal parameters of the image recorders used to record images of the scene, may further be expressed as a function of the normal vector n of the reference plane π1 as follows:

$$A = M'(R + v'n^T)M^{-1} \qquad \text{Eqn. (21)}$$

where, as above, M and M' represent the intrinsic parameter matrices for the image recorders, R represents the rotational external parameters, v' represents the epipole of the second image plane $\psi 2$, and "T" identifies the matrix transpose operation. However, while, as shown from equation Eqn. 21, the homography A can be determined from the internal and external parameters of the image recorders, from the above it will be recognized from the that the homography can be determined directly from projections in the images of three points from the scene and the epipoles of the image planes upon which the images were recorded.

Further in accordance with the invention, the image analyzer module 14 can use coordinates of the projections of points of objects in a scene onto the image plane $\psi 1$, along with the relative affine depth k, to determine the Euclidean (three-dimensional) structure of the objects in the scene. First, it will be assumed that the image recorder associated with image plane $\psi 1$ is calibrated, in which case its internal parameters matrix M (reference equation Eqn. 1) is the identity matrix I (matrix entries along the diagonal are all "one" and zero elsewhere), that is, M=I. If P represents a point of an object in the scene whose image has been recorded, and $\overline{P}$ is the projection of the point P onto the reference plane π in the direction of the image recorder at location O, and "p" represents the projection of the point P onto the image plane $\psi 1$, then P=zp, where "z" is a depth value to be generated using the relative affine depth value k generated for the point P. If r, s, and d represent parameters describing the reference plane π, then for any point $\overline{P}$ in the reference plane π, $\overline{P}=(\overline{x},\overline{y},\overline{z}) \in \pi 1$, then $\overline{x}r+\overline{y}r+\overline{z}=d$, and $d/\sqrt{r^2+s^{2+1}}$ is the distance from reference plane π1 to O, the center of projection of the image recorder. The values of r, s, and d may be provided by, for example, an explicit measurement of the scene. Since the image recorder is calibrated, then $\overline{P}=\mu p$, where $$\mu = \frac{d}{xr+ys+1} \qquad \text{Eqn. (22)}$$

It can be shown from equation Eqn. 19 that $$z = \frac{z_0\mu}{z_0-k(z_0-\mu_0)} \qquad \text{Eqn. (23)}$$

where $z_0$ is the distance from a reference point $P_0$ to the location O, which distance is assumed to be provided beforehand, and $$\mu = \frac{d}{x_0 r + y_0 s + 1} \qquad \text{Eqn. (24)}$$

Accordingly, with the various parameters defining the reference plane π and the distance from location O to a reference point $P_0$ in the scene, for any point P of an object in the scene, the distance z from the point P to location O can be determined from the value of the relative affine depth k determined above (equations Eqn. 18 and 20). As noted above, the value of relative affine depth k for each point P is invariant to the image recorders' internal parameters, and so errors in internal calibration of the image recorders will not affect the value of k. Errors in internal calibration would affect the Euclidean reconstruction up to at most a projective transformation (that is, by at most a scale, shear and stretch). In any case, the reconstruction will be better than using conventional methods that require internal calibration of both image recorders prior to the determination of any portion of the scene structure.

If neither image recorder is internally calibrated, then the assumption that P=zp may not be correct. In that case, the image analyzer module 14 may use conventional tools from projective geometry to generate a Euclidean (three-dimensional) reconstruction of objects in a scene. If the coordinates of five points in three-dimensional (Euclidean) space are provided, then the image analyzer module 14 can, using conventional techniques, generate a four-by-four matrix T that is a projective transformation that can be used to generate the Euclidean coordinates of any point P in the scene from the coordinate representation (x, y, 1, k) of the point relative to the image plane $\psi 1$.

Other techniques for performing these operations will also be apparent to those skilled in the art from the methods described in this and the previous paragraph.

The procedure for determining three-dimensional Euclidean structure of a scene from the coordinates of the projection of points in the scene onto an image plane, such as image plane ψ1, and the projective depth invariant values κ for each point, is basically similar to that described above in connection with the equations Eqn. 22 through Eqn. 24, except that parameters involving the two reference planes π1 and π2 are used. In that case, reference plane π1 is defined by parameters $r_1$, $s_1$ and $d_1$, and reference plane π2 is defined by parameters $r_2$, $s_2$ and $d_2$. The projection of point P in the scene onto the image plane ψ1 is identified by "p", in which case P=zp, and points $P_{\pi 1}$ and $P_{\pi 2}$, the projections of point P onto reference planes π1 and π2, respectively, are $P_{\pi 1}=\mu p$ and $P_{\pi 2}=\rho p$, where $$\mu = \frac{d_1}{xr_1 + ys_1 + 1} \quad \text{Eqn. (25)}$$

and $$\rho = \frac{d_2}{xr_2 + ys_2 + 1} \quad \text{Eqn. (26)}$$

where x and y represent the coordinates of the projection "p" of point P on the image plane ψ1. In that case, $$z = \frac{\kappa \rho^2 \mu_0 (z_0 - \mu_0) - \mu^2 \rho_0 (z_0 - \rho_0)}{\kappa \rho \mu_0 (z_0 - \mu_0) - \mu \rho_0 (z_0 - \rho_0)} \quad \text{Eqn. (27)}$$

where $z_0$, $\mu_0$ and $\rho_0$ are corresponding parameters for reference point $P_0$ in the scene. The image analyzer module can determine z and the coordinates x and y of respective points P on objects in the scene, and thereby determine the three-dimensional (Euclidean) structures of the objects.

Although the arrangement 10 (FIG. 1) has been described as having two image recorders 11A and 11B located at two different locations, it will be appreciated that the arrangement may comprise a single image recorder moved between the two locations.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A method for generating a reconstruction of a scene from two two-dimensional images of at least one object in a three-dimensional scene as recorded from a plurality of diverse locations, each location defining an image plane for one of said images, including:

A. identifying, for each image plane, coordinates defining an epipole location, the epipole location for each said image plane comprising a point of intersection between of a line interconnecting the locations and the respective image plane;

B. using the epipoles and coordinates in the respective image planes of selected reference points in the scene which define at least one reference plane to generate a homography that relates coordinates of projections of the selected respective points onto the image planes;

C. using the homography generated by the homography generating means and coordinates of the projection of at least one additional point in the respective image planes to generate a depth value; and D using coordinates of projection of at least one point of the object onto the image planes and the depth value generated by the depth value generator for said at least one point for generating a reconstruction of said at least one point in the scene.

* * * * *